April 3, 1928.
R. E. SLADE ET AL
1,664,997
PROCESS OF DRYING GASES
Filed Jan. 28, 1926
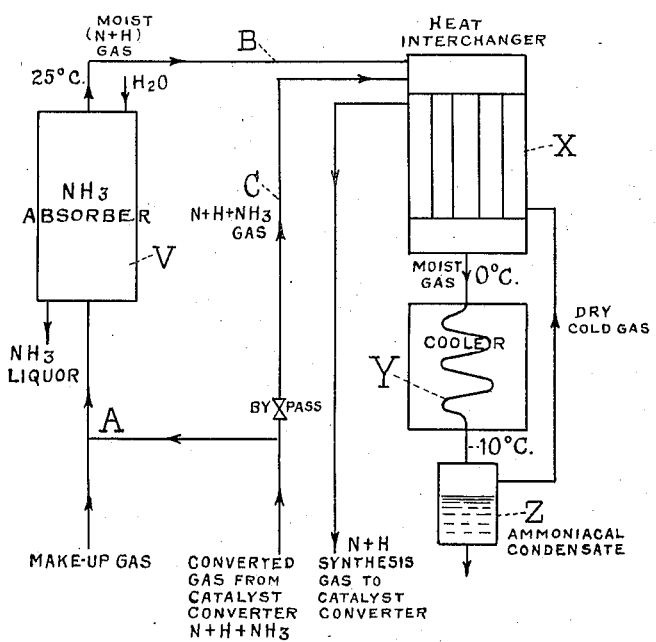
WITNESS
INVENTORS
ROLAND E. SLADE
VICTOR .E. PARKE
BY
ATTORNEYS Patented Apr. 3, 1928.

1,664,997

UNITED STATES PATENT OFFICE.

ROLAND EDGAR SLADE, OF BILLINGHAM-ON-TEES, AND VICTOR EMMANUEL PARKE, OF RUNCORN, ENGLAND, ASSIGNORS TO ATMOSPHERIC NITROGEN CORPORATION, OF SOLVAY, NEW YORK, A CORPORATION OF NEW YORK.

PROCESS OF DRYING GASES.

Application filed January 28, 1926, Serial No. 84,323, and in Great Britain January 28, 1925.

This invention relates to the drying of gas and more particularly such gas as is used in the synthesis of ammonia. The object of the invention is to remove aqueous vapor from gas with which such vapor is associated, by refrigerating the gas mixture after having first caused the gas to contain sufficient gaseous ammonia to cooperate with the aqueous vapor in forming a condensate in which a condition of liquidity will be preserved, thus preventing congealing of the aqueous vapor to solid ice.

The invention being particularly applicable to the treatment of gas used for ammonia synthesis, it will be described with reference to that art and to that phase of said art in which a mixture of nitrogen and hydrogen gas intended to be catalytically converted into ammonia, is subjected to the drying treatment of this invention. These gases are often moist as they have undergone preliminary purifications by contact with aqueous solutions. Further, in processes in which the gases are circulated, the freshly synthesized ammonia is often removed from the circulating gases by treating these gases with water, and as a result of this treatment the gases denuded of ammonia become charged with water vapor. Now water has a harmful effect upon the synthesis process as a whole, in that the activity of the catalyst is seriously impaired thereby and that consequently considerably less ammonia is made than when the gases are dried and thereafter passed over the catalyst. It is, therefore, particularly of importance that any water introduced into the synthesis gases shall be removed before the gases encounter the catalyst, and this invention provides a convenient and efficient means for this purpose.

It is preferred to treat the mixed gases but if desired the invention is applicable to either the nitrogen or hydrogen separately and the term "gases" is to be construed accordingly. We prefer to treat the gases at the synthesis pressure.

It has already been proposed to dry gases by refrigeration but if it is desired to reduce the water content of the gases to a very low figure, it is necessary to cool to a temperature substantially below 0° C. for the vapor pressure of water even at 0° C. is still appreciable (4.5 mm. of mercury). The separation of solid rime or ice in the cooling tubes would, of course, lead to blockages, and although separate change-over sections of coolers might be employed such a method is clumsy and expensive compared with that about to be described, which permits of removing by cooling practically all the water without the formation of ice.

According to our invention we cool or refrigerate the moist gases in presence of a small proportion of ammonia. The condensed water takes up a certain amount of ammonia from the gas, and the condensate becomes an ammoniacal solution, the freezing point of which lies far below that of pure water. Thus practically all the water present in the original gases is removed, for the partial vapor pressure of water over an ammoniacal solution at say −10° C. (minus ten) is exceedingly small.

One merit of our process is that it is not necessary to get rid of the agent (ammonia) which has been added to the gases for the purpose of removing the water therefrom in the liquid state. Moreover, even if it were desired to do so the removal could not be effected by cooling to a very low temperature for the vapor pressure of ammonia even at its freezing point is considerable (46 mm. of mercury). In practice a considerable proportion of the ammonia left in or added to the gases for the purpose of this invention, remains in the gases after the refrigerative drying has been accomplished. For example, with a gas containing about 0.1% of ammonia, nine-tenths of this amount may issue in the dried gases. The permissibility of this state of affairs is, of course, due largely to the circumstance that ammonia is not an impurity in the system, and the beneficial results of our invention are due primarily to this peculiarity.

In the accompanying diagram, which illustrates one method of carrying our invention into effect, V represents a tower where substantially the whole of any freshly synthesized ammonia may be removed from the circulating gases by scrubbing with water. At the bottom A, of this tower, it is generally convenient to introduce the make-up gases which then mix with the circulating gases, the mixture leaving the tower by B, in a moist state. Into these gases a small amount of ammonia is now introduced by any suitable means, for example, by by-passing a certain amount of the original ammoniacal gases through the by-pass C. If the moist gases leave V at a temperature of say 25° C. and substantially freed of ammonia, then a suitable amount of ammonia to be added may be from 0.01 to 0.1 per cent by volume, although larger amounts can be used provided that the passage of ammonia into the final gases does not materially affect the net make of ammonia in the catalytic process as a whole. From B the gases enter a heat interchanger X through which they flow in heat exchange relation with the cold gases which have undergone the refrigerative drying. Emerging from X at say 0° C. the cold moist gases pass to a cooling coil Y, cooled externally by any suitable agent, such as brine or liquid ammonia. In this coil Y the temperature of the gases is still further reduced say to −10° C. and there is formed an ammoniacal condensate which together with any preliminary condensate which may form in X and which drains into the coil Y, contains practically all the water originally present in the gases. The condensate is collected in a vessel Z and the cold dry gas returns to the interchanger X where it abstracts heat from the entering raw gases and finally emerges at a temperature slightly below that of the initial gases.

When treated in this way the gases obtained do not contain more water vapor than 1 to 5 parts by volume in 100,000 when, for example, the pressure is 200 atmospheres. The larger the quantity of ammonia introduced with the moist gases the more efficient will be the removal of water therefrom, but although small amounts of ammonia in the pre-catalysis gases are not objectionable yet the presence of too great a quantity of ammonia results in a decrease in the efficiency of the catalytic cycle as regards net make of ammonia. Consequently although it is preferred to work this process while adding less than 0.1 per cent of ammonia to the moist gases, the process may nevertheless be advantageously employed where the gases contain say .3–.5% of ammonia especially in such cases where other economies, effected at other parts of the system (but resulting in a .3–.5% ammonia content of the gases) counterbalance the slight decrease in the efficiency of the catalytic cycle resulting from such increase in ammonia content of the synthesis gas. Instead of, or in addition to, adding ammonia to the moist circulating gases we may remove ammonia incompletely therefrom at the stage in which the gases leaving the catalyst are scrubbed with water and in that case the positive addition of any further amounts of gaseous ammonia may be dispensed with, but it is easier to adjust the proportion of ammonia by operating as first described.

The gases are then obtained in such a dry state that they exhibit little, if any sensible poisonous action on the catalyst, and its life and efficiency are accordingly greatly increased.

Having now particularly described and set forth the nature of our said invention and in what manner the same is to be performed, we claim:

1. The process of drying gases containing water vapor which consists in causing said gas mixture to be accompanied by gaseous ammonia limited in amount on the one hand to produce an aqueous ammoniacal solution on subsequent refrigeration of the gas mixture but sufficient in amount on the other hand to assure a liquid condition in the condensate upon subsequent reduction of the temperature of the gas mixture to below 0° C., and then subjecting the said gas mixture to temperatures below 0° C., collecting and removing the condensate as ammoniacal liquor and passing the gas thus dried to its industrial use.

2. In the process of drying gas for use in the manufacture of synthetic ammonia, the steps which comprise scrubbing an ammonia containing gas which is subsequently to participate in the synthesis with a liquid capable of absorbing ammonia, setting up in the residual gas a condition such that it contains in addition to its water vapor content a small percentage of gaseous ammonia sufficient, upon subsequent reduction of the temperature of the gas to below 0° C., to preserve a condition of liquidity in the condensate, then subjecting the gas mixture aforesaid to a temperature below 0° C., collecting and removing the condensate as ammoniacal liquor and passing the gas thus dried to an ammonia catalyst in the synthesis system.

3. A process such as described in claim 2 in which the conditioning of the gas is brought about after the scrubbing step and by the introduction of limited amounts of gaseous ammonia into the gas stream prior to the refrigeration operation.

4. A process such as described in claim 2 in which the conditioning of the gas is brought about after the scrubbing step and by by-passing a small quantity of gases leaving the catalyst converter into the gas stream prior to the refrigerating operation.

5. A process such as described in claim 2 in which the conditioning of the gas is brought about after the scrubbing step and by the introduction of approximately 0.01 to 0.1% of ammonia into the gas stream prior to the refrigerating operation.

6. A process such as described in claim 2, in which the gases are under pressure and in which the refrigeration step is conducted at about −10° C.

7. A process such as described in claim 2 in which, between the scrubbing operation and the refrigerating operation the inflowing gases are caused to pass in heat-exchange relation with the cold gas from which the liquid condensate has been removed by the refrigerating operation.

8. The process which comprises preparing a gas mixture suitable for use in the manufacture of synthetic ammonia, said mixture being substantially free from though still containing some water vapor, then drying said mixture by causing it to be accompanied by gaseous ammonia, limited in amount on the one hand to produce an aqueous ammoniacal solution on subsequent refrigeration of the gas mixture but sufficient in amount on the other hand to assure a liquid condition in the condensate upon subsequent reduction of the temperature of the gas mixture to below 0° C., and then subjecting the said gas mixture to temperatures below 0° C., collecting and removing the condensate as ammoniacal liquor and passing the gas thus dried to the next step in its utilization in the manufacture of synthetic ammonia.

9. The process which comprises preparing gas for use in the manufacture of synthetic ammonia, purifying said gas by treatment including contact with aqueous solution, subjecting the resultant gas containing water vapor from said preceding purification step to a drying operation which consists in causing the gas mixture to be accompanied by gaseous ammonia, limited in amount on the one hand to produce an aqueous ammoniacal solution on subsequent refrigeration of the gas mixture but sufficient in amount on the other hand to assure a liquid condition in the condensate upon subsequent reduction of the temperature of the gas mixture to below 0° C., and then subjecting the said gas mixture to temperatures below 0° C., collecting and removing the condensate as ammoniacal liquor and passing the gas thus dried to the next step in its utilization in the manufacture of synthetic ammonia.

In testimony whereof we have hereunto set our hands.

ROLAND EDGAR SLADE.
VICTOR EMMANUEL PARKE.